(No Model.)  3 Sheets—Sheet 1.

C. C. NEWTON.
SAW GRINDING MACHINE.

No. 519,893. Patented May 15, 1894.

WITNESSES
F. D. Goodwin
W. N. Bass

INVENTOR
Chas C. Newton
By his Attorneys (No Model.)

3 Sheets—Sheet 2.

C. C. NEWTON.
SAW GRINDING MACHINE.

No. 519,893. Patented May 15, 1894.

WITNESSES
F. D. Goodwin
W. A. Barr

INVENTOR
Chas. C. Newton
By his Attorneys
Hinton & Hinton (No Model.) 3 Sheets—Sheet 3.
C. C. NEWTON.
SAW GRINDING MACHINE.

No. 519,893. Patented May 15, 1894.

WITNESSES
F. D. Goodwin
W. H. Barr

INVENTOR
Chas C. Newton
By his Attorneys

UNITED STATES PATENT OFFICE.

CHARLES C. NEWTON, OF PHILADELPHIA, PENNSYLVANIA.

SAW-GRINDING MACHINE.

SPECIFICATION forming part of Letters Patent No. 519,893, dated May 15, 1894.

Application filed February 9, 1894. Serial No. 499,626. (No model.)

*To all whom it may concern:*

Be it known that I, CHARLES C. NEWTON, a citizen of the United States, residing in Philadelphia, Pennsylvania, have invented certain Improvements in Saw-Grinding Machines, of which the following is a specification.

The object of my invention is to construct a machine for grinding saws which will automatically feed the teeth of the saw to the grinder and in which the grinding tool will be traversed across the face of each tooth.

Figure 1:
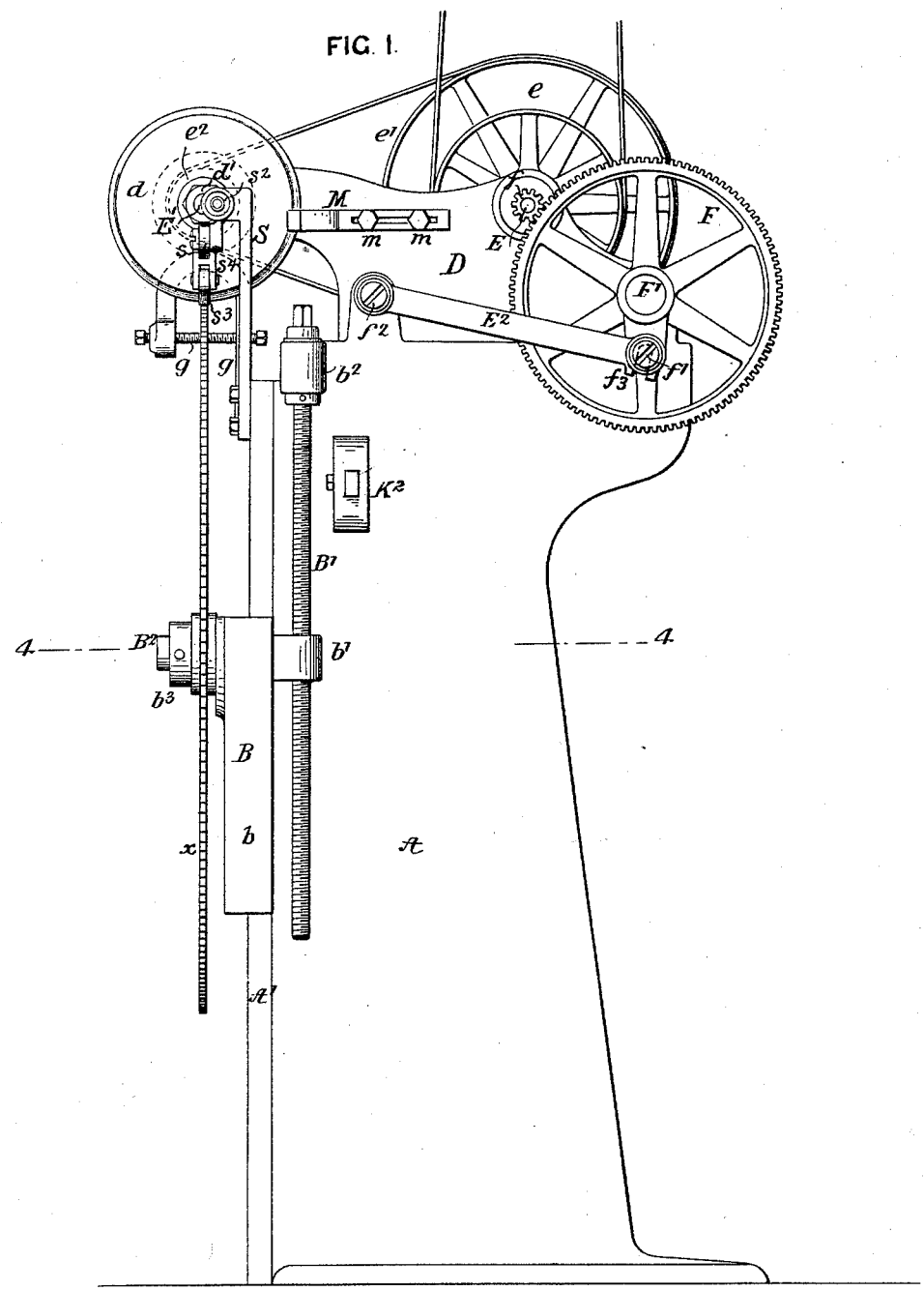
Figure 2:
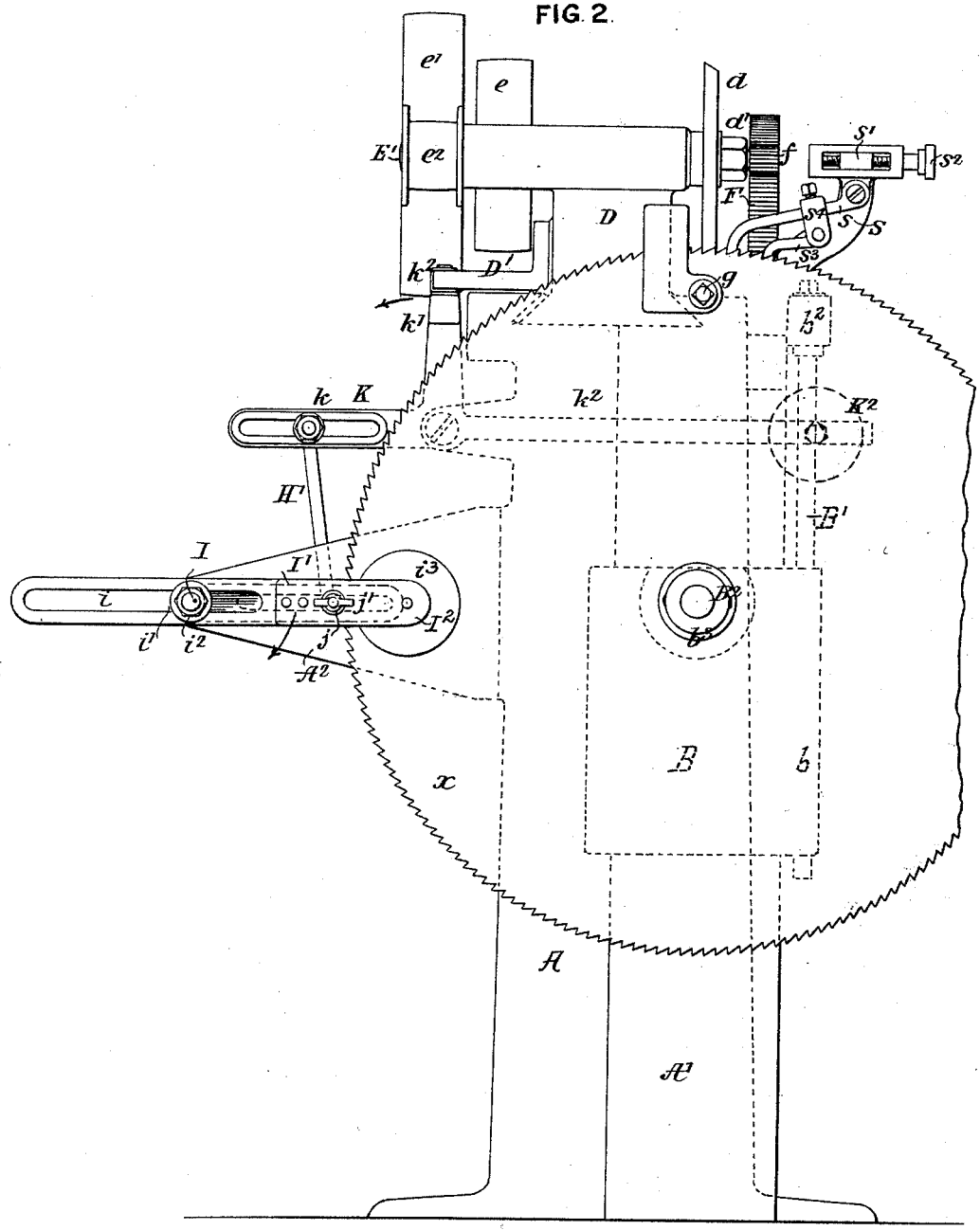
Figure 3:
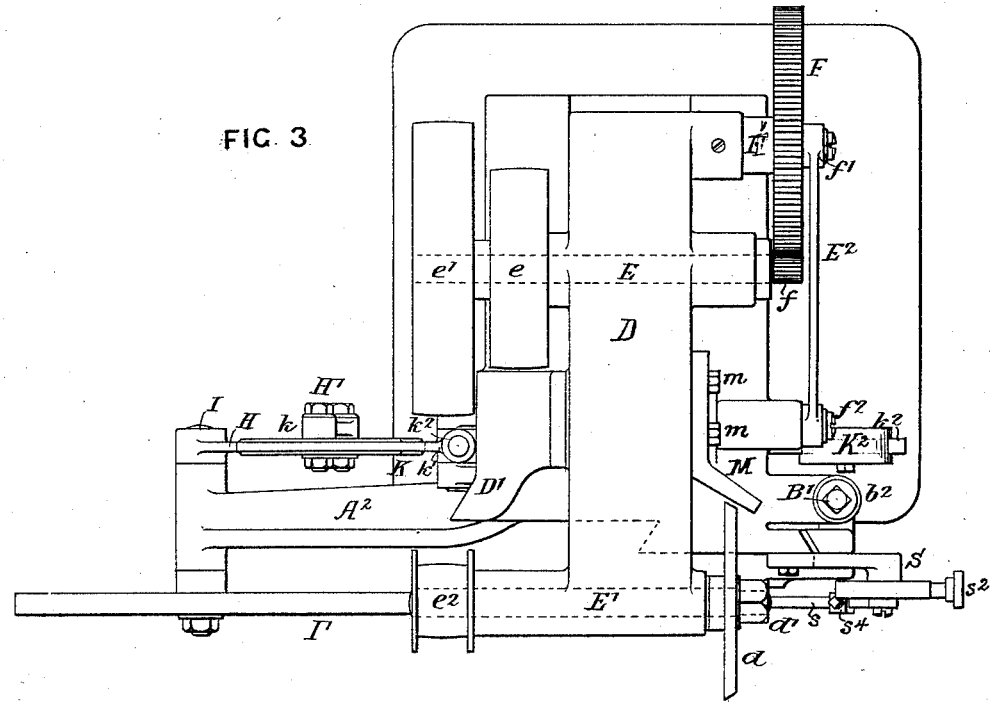

Referring to the accompanying drawings:—Figure 1, is a side view illustrating my improved saw grinding machine. Fig. 2, is a face view. Fig. 3, is a plan view; and Fig. 4, is a sectional plan view on the line 4—4, Fig. 1.

Figure 4:
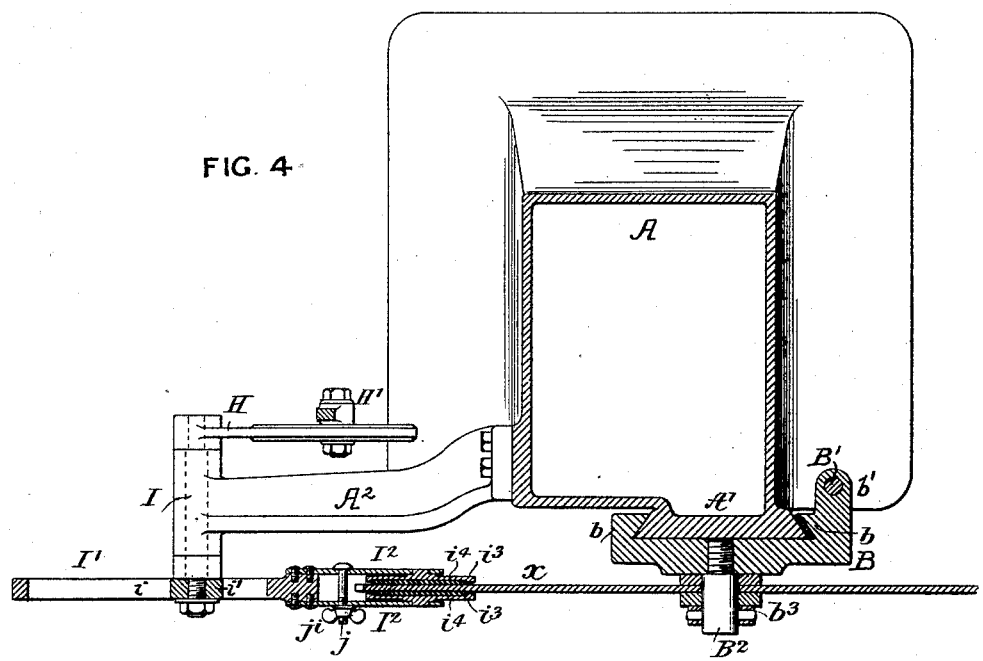

A is a standard, on the face of which is an undercut guide way $A'$, clearly shown in Fig. 4, and adapted to this guideway is a slide B, flanges $b$ of which are adapted to the under cut edges of the guide way; on the back of this slide is a screw threaded lug $b'$ adapted to which is a feed screw $B'$ held in position longitudinally in a lug $b^2$ on the standard A of the machine. The head of this screw is shaped to receive a wrench so that the screw can be turned and thus elevate or lower the slide B; on the slide is a stud $B^2$ on which is mounted the saw $x$ to be ground, this saw is held in position on the stud by a cap $b^3$ so that while it is supported by the stud it can freely turn thereon.

Adapted to a slideway in the head of the standard A is a carriage D, which carries the grinding tool $d$ and also the driving shaft E of the machine; the driving belt from a counter shaft passes around a belt pulley $e$ on the shaft E and on the shaft adjacent to this pulley is a larger pulley $e'$ around which passes a belt to a pulley $e^2$ on the shaft $E'$ carrying the grinding disk $d$, this grinding disk is secured to the shaft by a nut $d'$ and is beveled to conform to the shape of the tooth, as shown clearly in Fig. 2.

On one end of the driving shaft E is a pinion $f$ engaging with a gear wheel F mounted on a stud $F'$ projecting from the carriage D and on this gear wheel is a crank pin $f'$ to which is connected a rod $E^2$ pivoted to a stud $f^2$ on the standard A so that as the shaft E is revolved the gear wheel will be turned and as this gear wheel is on the carriage and its crank is connected to the fixed stud the carriage will slide on the standard and the grinding disk will travel across the face of the tooth of the saw at the same time it will be rotated by the means described above. The portion of the saw acted upon by the grinder is held laterally by two screws $g\ g$, Fig. 1, one on each side of the saw. These screws can be set to the thickness of the saw, so as not to interfere with the feed of the saw from one tooth to another.

I feed the saw to the grinding disk in the following manner during the interval the disk is clear of the saw: Projecting from the standard A is a bracket $A^2$ in which is a rock shaft I carrying an arm $I'$ which is adjustable on said shaft, this arm has a slot $i$ through which passes the end of the shaft and on which is a block $i'$ adapted to the slot; a nut $i^2$ secures the shaft to the arm $I'$ after adjustment. The end of the arm $I'$ is forked forming two fingers $I^2$, one extending on each side of the saw blade as clearly shown in Fig. 4, and pivoted to these fingers are disks $i^3$ having friction material $i^4$; a bolt $j$ extends through the two fingers and is provided with a nut $j'$ so that more or less friction can be applied by turning the nut. I preferably make the fingers of spring metal, but I do not wish to limit myself to this construction. On the rear end of the shaft I is a slotted arm H connected to the slotted arm $k$ of a bell crank lever K by a connecting rod $H'$ which is adjustable on both arms, the other arm $k'$ of the bell crank lever K has a friction roll $k^2$ against which strikes a cam $D'$ secured to the carriage D; the bell crank lever K is pivoted to the standard A and has an arm extending through the standard to the opposite side of the machine, this arm is provided with a weight $K^2$, as shown in Fig. 2, which keeps the roller $k^2$ against the cam $D'$, a spring may be used in place of the weight if desired. When the carriage moves back and the grinding disk is clear of the saw, the cam lug $D'$ strikes the arm of the bell crank lever moving said lever in the direction of the arrow (Fig. 2) and consequently the arm $I'$ is moved in the direction of its arrow, moving the saw the distance required. In order to prevent the saw returning with the friction feed, I mount a pawl *s* on a bracket S secured to the standard A, this pawl engages with the teeth of the saw preventing the return of the saw with the friction feed. The pawl also insuring the proper relation of the saw to the grinder as the friction feed will keep the saw hard against the pawl. To accommodate different teeth I mount the pawl on an adjustable block *s'* which can be adjusted in the bracket S towards and from the grinding disk by a feed screw $s^2$. On the pawl *s* is an adjustable hanger $s^4$ carrying the supplemental pawl $s^3$ which engages with a tooth back of the pawl *s* so that in the event of a saw having one or more broken teeth being mounted in the machine one or other of the pawls will hold the saw and prevent it returning with the friction feed.

The operation of the machine is as follows:—The saw is mounted on the spindle $B^2$ and the pawls *s*, $s^3$ are set to the teeth of the saw so that the grinding disk will align with the teeth, the friction feed is adjusted and the machine set in motion. The grinder will pass across the face of a tooth and on its return the cam lug will operate the friction feed, turning the saw one tooth; each pawl will fall back of a tooth preventing the return of the saw with the friction feed and the grinder will again traverse across the face of the saw and grind the next tooth and so on until all the teeth are ground. The grinding disk can be made of different shapes, the shape shown in the drawings grinds the face of the tooth as well as the inclined back. I mount on the carriage D a rest M for a tool for trimming off the grinding disk, this is secured to the carriage by bolts which pass through a slot in the shank of the rest. During the trimming the connecting rod $E^2$ is detached from the crank *f'* and I may make the end of the rod forked as shown in Fig. 1, so that it can be readily detached from the crank without removing the screw.

I claim as my invention—

1. The combination in a saw grinder, of the spindle for the saw, the grinder, a friction feeding device for feeding the saw forward and a pawl for stopping the return of the saw with the feeding device, substantially as described.

2. The combination of the spindle on which the saw is mounted, the friction feed consisting of an arm having two fingers clamping the saw, a pawl for limiting the return of the saw with the friction feed and a grinder adapted to traverse across the face of the saw, substantially as described.

3. The combination of the spindle for the saw, the vibrated arm, friction disks on said arm bearing against the saw, pawls engaging with the teeth of the saw preventing the return of the saw with the friction feed, a sliding carriage, a grinder on said carriage adapted to grind the teeth of the saw and a lug on the carriage acting upon the friction feed mechanism, substantially as described.

4. The combination of the spindle for the saw, the vibrated arm, carrying devices adapted to come into frictional contact with the saw and move the same, a vibrated shaft on which said arm is mounted, a bell crank lever connected to said shaft, a reciprocated carriage carrying the grinding tool, and a cam lug on said carriage adapted to strike one arm of the bell crank lever and thus operate the friction feed, substantially as described.

5. The combination in a saw grinding machine, of the support for the saw, the grinding tool adapted to pass across the face of a saw, a vibrated feed arm having two fingers one on each side of the saw, and friction disks mounted on said fingers, with means for adjusting the disks so as to increase or diminish the friction, substantially as described.

6. The combination in a saw grinding machine, of the support for the saw, the friction feed mechanism the grinding tool, and a stop pawl adjustable toward and from the grinding tool, substantially as described.

7. The combination of the support for the saw, the friction feed mechanism, the grinding tool, the pawl *s* mounted on a block *s'*, said block being adjustable toward or from the grinding tool and a supplementary pawl $s^3$, substantially as described.

8. The combination of the spindle for the saw, a vertically adjustable slide carrying said spindle, a screw for adjusting and locking said slide, a friction feed device for feeding the saw, a stop pawl for the saw, a reciprocated carriage carrying the grinder and means on the carriage for operating the friction feed mechanism, substantially as described.

9. The combination of the support for the saw, the feeding mechanism for said saw, a reciprocated carriage, a grinder mounted thereon, a driving shaft mounted on the said carriage and a crank and connecting rod, said rod connecting the crank to a fixed portion of the machine so that the carriage will be reciprocated, substantially as described.

10. The combination in a saw grinding machine, of the support for the saw, feeding mechanism, the grinding disk, a carriage on which said disk is mounted, a driving shaft on said carriage adapted to drive the driving disk, a crank on the carriage geared to the driving shaft, and a rod connecting said crank to the fixed portion of the machine so that the driving shaft and grinder will reciprocate with the carriage, substantially as described.

In testimony whereof I have signed my name to this specification in the presence of two subscribing witnesses.

CHARLES C. NEWTON.

Witnesses:
H. W. CHAMPION,
E. J. HANNUM.